United States Patent [19]

Bornatsch et al.

[11] Patent Number: 4,502,863
[45] Date of Patent: Mar. 5, 1985

[54] SOLID DYESTUFF FORMULATIONS CONTAINING ETHYLENICALLY UNSATURATED ACID, ESTER AND ACRYLONITRILE COPOLYMER

[75] Inventors: Wolfgang Bornatsch; Robert Kuth, both of Cologne; Hermann Perrey, Krefeld, all of Fed. Rep. of Germany

[73] Assignee: Bayer Aktiengesellschaft, Leverkusen, Fed. Rep. of Germany

[21] Appl. No.: 501,035

[22] Filed: Jun. 3, 1983

[30] Foreign Application Priority Data

Jun. 23, 1982 [DE] Fed. Rep. of Germany ....... 3223333
Jul. 24, 1982 [DE] Fed. Rep. of Germany ....... 3227675

[51] Int. Cl.³ .................. C09B 67/02; D06P 1/16; D06P 3/54
[52] U.S. Cl. .................................... 8/524; 8/558; 8/650; 8/922
[58] Field of Search .................... 8/524, 558

[56] References Cited

U.S. PATENT DOCUMENTS

| | | | |
|---|---|---|---|
| 3,980,602 | 9/1976 | Jakubauskas | 524/431 |
| 4,166,811 | 9/1979 | Marr et al. | 523/202 |
| 4,197,087 | 4/1980 | Ami et al. | 8/554 |
| 4,243,430 | 1/1981 | Sperry et al. | 106/308 M |
| 4,297,100 | 10/1981 | Koci et al. | 8/527 |
| 4,340,531 | 7/1982 | Wegmann | 524/556 |

FOREIGN PATENT DOCUMENTS 1537597 1/1979 United Kingdom .
2003194 3/1979 United Kingdom .
2005697 4/1979 United Kingdom .

Primary Examiner—A. Lionel Clingman
Attorney, Agent, or Firm—Sprung Horn Kramer & Woods

[57] ABSTRACT

Solid dyestuff formulations having excellent dyebath stability are obtained in an economical manner by mixing a water-insoluble textile dyestuff with a dispersant and a carboxyl-containing copolymer of
(a) an $\alpha,\beta$-ethylenically unsaturated monocarboxylic acid,
(b) a non-basic ester of an $\alpha,\beta$-ethylenically unsaturated monocarboxylic acid, and
(c) an unsaturated aliphatic or aromatic hydrocarbon or acrylonitrile, bead-milling the mixture down to a particle size of, preferably, 1–2$\mu$, and then spray-drying the ground mixture. If desired the dispersant can also be added during the synthesis of the dyestuff, as a consequence of which early addition the milling process can be dispensed with.

5 Claims, No Drawings

SOLID DYESTUFF FORMULATIONS CONTAINING ETHYLENICALLY UNSATURATED ACID, ESTER AND ACRYLONITRILE COPOLYMER

The invention relates to solid formulations which contain a water-insoluble textile dyestuff, a dispersant and a polymeric protective colloid, characterised in that this protective colloid is a carboxyl-containing copolymer of at least the three following classes of monomeric compounds:

(a) an $\alpha,\beta$-ethylenically unsaturated monocarboxylic acid, (b) a non-basic ester of an $\alpha,\beta$-ethylenically unsaturated monocarboxylic acid, and (c) an unsaturated aliphatic or aromatic hydrocarbon or acrylonitrile.

The weight ratio of the monomers, (a) to (b) to (c), is in general 10–50:89–10:1–40, preferably 20–50:70–10:-10–40.

Examples of suitable monomers (a) are crotonic acid, a $C_1$–$C_4$-(alkyl) half ester of maleic acid, and, preferably, acrylic acid and methacrylic acid.

Examples of suitable monomers (b) are optionally OH-substituted $C_1$–$C_6$-alkyl esters of acrylic and methacrylic acid, such as the methyl, ethyl, n-propyl, n-butyl, hydroxyethyl and hydroxypropyl esters.

Suitable monomers (c), in addition to the preferred acrylonitrile, are styrene, methylstyrene, butadiene or isoprene.

Polymers having the following composition are very particularly preferred:

Polymer 1: 43% of butyl acrylate, 17% of acrylonitrile, 40% of methacrylic acid.

Polymer 2: 43% of butyl acrylate, 17% of acrylonitrile, 40% of acrylic acid.

Polymer 3: 33% of butyl acrylate, 50% of methacrylic acid, 17% of styrene.

Polymer 4: 43% of butadiene, 10% of methacrylate, 40% of methacrylic acid, 7% of acrylonitrile.

Polymer 5: 43% of butyl acrylate, 20% of methacrylic acid, 37% of acrylonitrile.

The polymerisation products composed of the monomers (a)–(c) and, if appropriate, further copolymerisable monomers have molecular weights of 1,000–500,000, preferably 1,500–150,000. They are preferably used in the form of aqueous solutions of the alkali metal or ammonium salts. The copolymers are prepared by methods which are in themselves known, for example by means of emulsion polymerisation in the presence of, for example, dodecylmercaptan as a regulator and in the presence of customary emulsifiers.

Suitable water-insoluble dyestuffs are commercially available disperse dyestuffs and brighteners and vat dyestuffs. Disperse dyestuffs for dyeing from an aqueous liquor are preferred.

Suitable dispersants are anionic or nonionic types.

Suitable anionic surface-active compounds are described in K. Lindner, Tenside-Textilhilfsmittel-Waschrohstoffe [Surfactants/Textile Auxiliaries/Detergent Bases], 2nd edition, Wiss. Verlagsgesellschaft, Stuttgart, 1964, Volume I, pages 571–836, or in Ullmanns Encyklopädie der technischen Chemie [Ullmann's Encyclopedia of Industrial Chemistry], 4th edition, Verlag Chemie, Weinheim/Bergstr., 1975, Volume 10, pages 457–458.

Those anionic dispersants are particularly suitable which are members of the following classes of material: condensation products of formaldehyde with aromatic sulphonic acids (for example dinaphthylmethanesulphonate), fatty acid salts and sulphates, sulphates of fatty acid esters and amides, alkyl sulphates, sulphates of oxyalkylated alcohols, sulphates of acylated alkanolamines, long-chain alkyl sulphonates ($C_6$–$C_{20}$), fatty acid ester sulphonates, fatty acid amide sulphonates, sulphosuccinates and amides, ($C_6$–$C_{20}$-alkyl)-acyltaurides, perfluorinated alkyl sulphonates, alkylbenzenesulphonates, alkylnaphthalenesulphonates, aryl ether sulphonates, alkylbenzimidazolesulphonates, alkoxycarboxylates, salts of alkylmalonic acid, salts of alkylsuccinic acid, soaps, and ligninsulphonates.

The following are very particularly preferable: the diethylamine salt of oleic acid, palmitinesulphonate, $C_{15}$-n-alkyl sulphonate, $C_{12}$–$C_{14}$-alkyl sulphonate, disodium N-octadecylsulphosuccinimate, tetrasodium N-(1,2-dicarboxylethyl)-N-octadecylethylsulphosuccinimate, sodium dicyclohexylsulphosuccinate, disodium isodecylsulphosuccinate, sodium diamylsulphosuccinate, sodium dioctyl sulphosuccinate, sodium dihexylsulphosuccinate, dibutylnaphthalenesulphonate, n-dodecylbenzenesulphonate, dioctyl glycerol ether sulphate, and oleyl alcohol sulphate.

Examples of suitable nonionic dispersants are polyoxyalkylated (preferably polyethoxylated) fatty alcohols, polyols, mercaptans, amines, amides, sulphonamides, phenols, fatty acids, naphthenic acids and abietic acid and fatty acid esters of polyols as described in Ullmanns Encyklopädie der technischen Chemie [Ullmann's Encyclopedia of Industrial Chemistry], 4th edition, Verlag Chemie, Weinheim, Bergstrasse, 1975, Volume 10, page 456.

"Solid formulations" are understood as meaning above all pulverulent, tablet-shaped and granulated dyestuff formulations.

These formulations are generally prepared by a method whereby an aqueous dispersant- and protective colloid-containing virtually solvent-free dispersion of a finely divided dyestuff is dried under conditions which as far as possible preserve the particle size; the dispersion is preferably spray-dried since this drying method is the most important one in industry which satisfies this requirement.

One version of the process is characterised in that an aqueous suspension of the dyestuff, preferably the moist filter press cake as obtained directly in the synthesis of the dyestuff, is mixed with the dispersant and the protective colloid and, if appropriate, other auxiliaries (hydrotropic agents, antifoams, antifreezes, bactericides, fungicides and the like), and the mixture is ground at pH 5–10, preferably 6.5–8.8, in a suitable mill until the state of fine division desired has been reached, and is then sprayed in a spray-dryer. Similarly, the moist filter press cake of the dyestuff can be ground in a suitable mill in the presence of the dispersant, the protective colloid and the other auxiliaries (see above) are then added, and the mixture is then spray-dried.

In a special version of the process, namely for preparing the particularly preferred azo dyestuff formulations, the coupling reaction is carried out in the presence of dispersants, a pH of 5–10, preferably 6.5–8.0, is set when the reaction is ended, the protective colloid is added, and the resulting mixture is spray-dried—if appropriate after a 30 to 60 minute period of heating at 50°–95° C.

The dyestuff powders obtained by any desired method can, if desired, also be tabletted.

All versions of the process have in common that they, unlike the processes described in German Offenlegungsschrift No. 2,816,539, are carried out in the absence of organic solvents.

Another particular advantage of this process is that compared to numerous conventional methods a smaller grinding effort is required. It is sufficient to subject the aqueous mixture of the components essential to the invention to comminution in a bead or sand mill until an average particle size has been reached which is greater than in the case of conventional dyestuff powders but is sufficiently small to force the particles in a conventional dyeing process with sufficient rapidity into solution, from which the dyestuff can be absorbed by the fibre.

In the special azo coupling process described above a secondary comminution stage can even be entirely dispensed with, the result being, however, that a greater inert salt content and hence a lower dyestuff content in the formulation has to be accepted.

In general the new formulations have the following composition in respect to their components essential to the invention (that is to say without considering inert salts which may be present and other auxiliaries): 30-98, preferably 60-95, % by weight of pure dyestuff 1-35, preferably 2.5-20, % by weight of dispersant 1-35, preferably 2.5-20, % by weight of protective colloid.

Depending on the method of preparation the dyestuff content in the formulation is (1) 30-98, preferably 60-95, % by weight of dispersant, protective colloid and, if desired, other auxiliaries are added after the dyestuff has been isolated, or (2) 30-60, preferably 35-55, % by weight of the dispersant is added during the preparation of the dyestuff.

The new dyestuff formulations are highly suitable for preparing dyestuff liquors for dyeing textile materials and liquor ratios of 5:1-100:1, preferably 10:1-40:1, since they can be very easily handled.

To obtain a stable dyestuff dispersion it is sufficient to stir the formulations, if necessary with heating, without further additives into the aqueous liquor.

In the case of disperse dyestuffs, which are preferably used, even dyebath-unstable modifications can be used, thereby dispensing with the otherwise customary conversion of a modification by heat treatment and/or chemical aftertreatment. The effluents obtained after the dyeing process are distinguished by a COD value (chemical oxygen demand) which is lower than that of effluents obtained with conventionally finished dyestuffs.

Other important advantages over aqueous formulations as described in, for example, German Patent Specification No. 2,816,539 are lower transport and storage costs, due to the elimination of the diluent, combined with a virtually unlimited shelf life.

Compared to other known formulations (compare, for example, German Offenlegungsschrift No. 2,100,439, German Offenlegungsschrift No. 2,027,537, British Patent Specification No. 717,840, British Patent Specification No. 818,750, U.S. Patent Specification No. 2,150,692, German Offenlegungsschrift No. 2,628,445) the new dyestuffs are surprisingly distinguished by the fact that they give dyebaths which are still more stable without having an adverse effect on the dyeing properties of the dyestuffs.

In particular, polyester fibre materials, for which the new formulations are preferably used, are dyed in a faultless manner, without specks or other unlevelness phenomena.

EXAMPLE 1

(a) Diazotisation 93.6 g of 3,4-dichloroaniline are added to a mixture of 320 ml of technical hydrochloric acid (36.5 g of HCl in 100 ml) and 160 ml of water, and the resulting mixture is stirred for at least 2 hours. It is then cooled down to 0°-5° C. with about 300 g of ice. 134.4 g of a sodium nitrite solution (30 g of $NaNO_2$ in 100 ml) are then added in the course of 30 minutes, and the mixture is stirred at 5° C. for 2 hours. Excess nitrite is destroyed with 30 ml of amidosulphuric acid (20 g in 100 ml). Volume: 850 ml. The diazotisation mixture is clarified with active charcoal.

(b) Coupling, and Finishing the Polymer 209.5 g of a 47% pure press cake of N-methyl-3-cyano-4-methyl-6-hydroxypyrid-2-one are dissolved with stirring in 640 ml of water containing about 45 ml of sodium hydroxide solution (40 g of NaOH in 100 ml) at pH 8.5 (20° C.). 19.5 g of dinaphthylmethanesulphonate (10% relative to dry pure dyestuff) and 19.5 g of the reaction product of nonylphenol with 20 mols of ethylene oxide (10% relative to dry pure dyestuff) are added. The pyridone is precipitated in a finely divided form by adding about 50 ml of technical hydrochloric acid (36.5 g of HCl in 100 ml) (pH 1). The diazotisation mixture is added in the course of 40 minutes in such a way that there is never excess diazotised 3,4-dichloroaniline detectable with R salt solution.

The pH of the mixture is then carefully adjusted in the course of 30 minutes with about 140 ml of sodium hydroxide solution (20 g of NaOH in 100 ml) to 7.0. 100.5 ml of polymer 1 (29.1% solids content) (15% relative to dry pure dyestuff) are dissolved in 200 ml of water containing 10 ml of sodium hydroxide solution (40 g of NaOH in 100 ml), and the solution is added. The mixture is stirred at 80° C. for 1 hour.

Final volume: about 2.5 liters

Solids content: 13.6%

(c) Spray-Drying

The dispersion is spray-dried at an inlet temperature of 180° C. and an outlet temperature of 80° C. 453 g are obtained of a powder which contains 41% of pure dyestuff (95% yield of theory). Residual moisture content: about 4%.

Composition of the powder: 41% of dyestuff, 4.1% of dinaphthylmethanesulphonate, 4.1% of the reaction product of nonylphenol with 20 mols of ethylene oxide, 6.2% of polymer 1 and 44.6% salt from the reaction.

Polyester fibres dyed under high-temperature conditions with this formulation—without the use of other customary auxiliaries and buffer substances—are given a deep level yellow dyeing.

EXAMPLE 2

(a) Grinding 41.2 kg of polymer 1 (29.1% solids content, corresponding to 10% of polymer relative to dry untreated dyestuff) are added with stirring to 170 liters of water in a stirred vat, and are dissolved at pH 7.5 with about 2.3 liters of a 40% strength sodium hydroxide solution. 12.0 kg of dinaphthylmethanesulphonate (corresponding to 10% relative to dry untreated dyestuff) followed by 137.1 kg of 87% pure press cake of the dyestuff of the formula

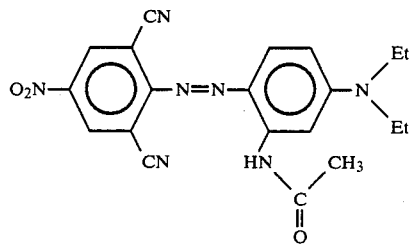

(corresponding to 120 kg of dry dyestuff) are then stirred in.

Volume: about 400 liters (including foam)
Concentration: about 35% with respect to dyestuff.

After a precomminution stage in the corundum disc mill the dispersion is bead-milled in a continuous bead mill using 31/5 gauge beads. 4 passes are generally sufficient. The temperature should not exceed 70° C. After grinding the particles should have a size of 1-2 μm. The dispersion is diluted with rinse water to a dyestuff content of 30%.

(b) Spray-Drying

The dispersion is spray-dried at an inlet temperature of 180° C. and an outlet temperature of 80° C.

Composition of the powder: 83.3% of dyestuff, 8.3% of polymer 1 and 8.4% of dinaphthylmethanesulphonate.

Moisture content: about 4%.

Polyester fibres are dyed a level blue with this colorant with the use of customary methods.

EXAMPLE 3

(a) Grinding 3.7 kg of dispersant (dinaphthylmethanesulphonate) (corresponding to 5% relative to dry untreated dyestuff) and 25.3 kg of polymer 1 (29.1% solids content, corresponding to 10% relative to dry untreated dyestuff) are added with stirring to 37.5 litres of water in a stirred vat. The polymer is dissolved at pH 6.5 by adding about 2.5 liters of a 40% strength sodium hydroxide solution. 140.0 kg of a 28.3% pure press cake of the dyestuff of the formula

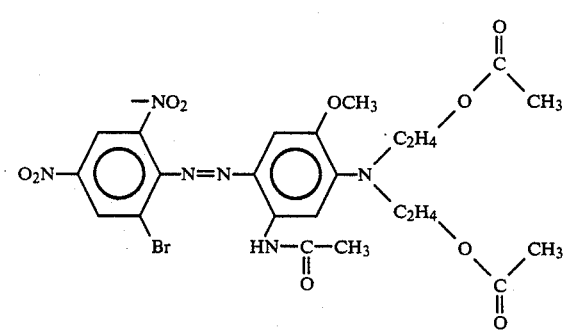

(corresponding to 39.75 kg of dry dyestuff), 43.2 kg of a 70% pure press cake of the dyestuff of the formula

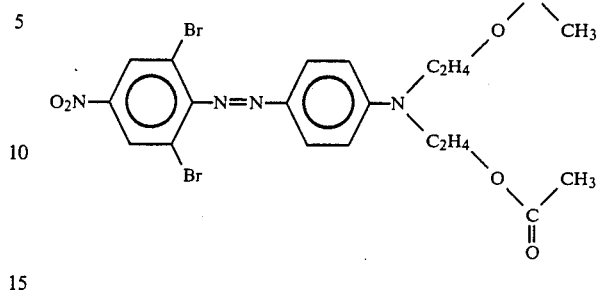

(corresponding to 30.25 kg of dry dyestuff) and 8.45 kg of a 42.3% pure press cake of the dyestuff of the formula

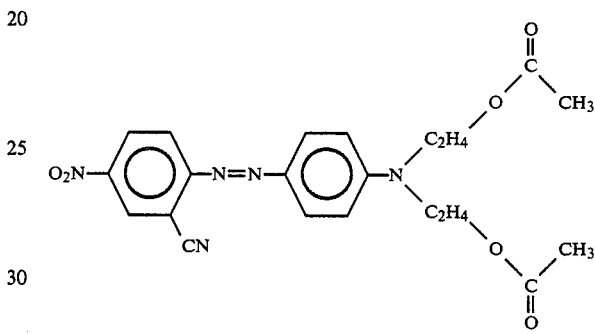

(corresponding to 3.6 kg of dry dyestuff) are stirred into the solution a little at a time.

Volume: about 350 liters (including foam).
Solids content: 26.6%.
Dyestuff concentration: 21%.

After a precomminution state in the corundum disc mill the dispersion is bead-milled in a continuous bead mill using 31/9 gauge bead. 4 passes are generally sufficient. Cooling should be applied, so that the temperature does not exceed about 20° C. After the grinding, the particles should have a diameter of about 1 μm.

(b) Spray-Drying

The dispersion is spray-dried at an inlet temperature of 180° C. and an outlet temperature of 80° C.

Composition of the powder: 87.0% of dyestuff, 8.7% of polymer 1 and 4.3% of dinaphthylmethanesulphonate. Moisture content: about 4%.

Polyester fibres are dyes with this formulation in a deep black shade free of any unlevelness phenomena whatsoever.

EXAMPLE 4

(a) Grinding 61.8 kg of polymer 5 (10% solids content, corresponding to 5% of polymer relative to dry untreated dyestuff) are added with stirring to 170 liters of water in a stirred vat, and are dissolved at pH 6.8 with about 2.3 liters of a 40% strength sodium hydroxide solution. 12.0 kg of dodecylbenzenesulphonate (corresponding to 10% relative to dry untreated dyestuff) followed by 147.25 kg of an 81.5% pure press cake of the dyestuff of the formula

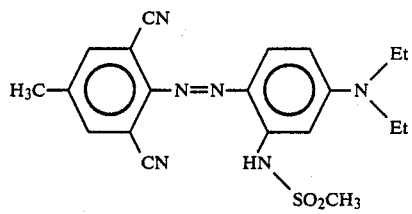

(corresponding to 120 kg of dry dyestuff) are then stirred in. Volume: about 450 liters (including foam), concentration: about 35% with respect to dyestuff.

After a precomminution stage in the corundum disc mill the dispersion is bead-milled in a continuous bead mill using 31/5 gauge beads. 4 passes are generally sufficient. The temperature should not exceed 70° C. After the grinding the particles should have a size of about 1 μm. The dispersion is diluted with rinse water to a dyestuff content of about 30%.

(b) Spray-Drying

The dispersion is spray-dried at an inlet temperature of 180° C. and an outlet temperature of 80° C.

Composition of the powder: 87.0% of dyestuff, 4.3% of polymer 5 and 8.7% of dodecylbenzenesulphonate. Moisture content: about 4%

Polyester fibres are dyed a perfect red.

EXAMPLE 5

(a) Grinding 6.0 kg of dinaphthylmethanesulphonate (corresponding to 5% relative to dry untreated dyestuff) and 61.8 kg of polymer 2 (29.1% solids content, corresponding to 15% of polymer relative to dry untreated dyestuff) are added with stirring to 40 liters of water in a stirred vat. The polymer is dissolved at pH 7.5 by adding about 2.3 liters of a 40% strength sodium hydroxide solution. 347.8 kg of a 34.5% pure press cake of the dyestuff of the formula

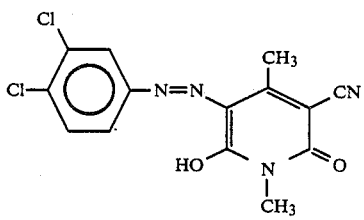

(corresponding to 120 kg of dry dyestuff) are then stirred in a little at a time.

Volume: about 450 liters (including foam).

Concentration: about 35% with respect to dyestuff.

After a precomminution stage in the corundum disc mill the dispersion is bead-milled in a continuous bead mill using 31/5 gauge beads. 4 passes are generally sufficient. The temperature should not exceed 70° C. After the grinding the particles should have a size of about 1 μm. The dispersion is diluted with rinse water to a dyestuff content of about 30%.

(b) Spray-Drying

The dispersion is spray-dried at an inlet temperature of 180° C. and an outlet temperature of 80° C.

Composition of the powder: 83.3% of dyestuff, 12.5% of polymer 2 and 4.2% of dispersing agent.

Moisture content: about 4%.

Polyester fibres are dyed level yellow.

EXAMPLE 6

118 g of the dyestuff of the formula

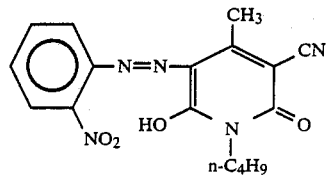

prepared according to German Offenlegungsschrift No. 1,917,278, and which is present in a dyebath-unstable modification, in 1.2 liters of water, is treated at pH 7.5 with 6.0 g of dioctyl sulphosuccinate (5% relative to dry dyestuff), 2.4 g of dinaphthylmethanesulphonate (2% relative to dry dyestuff) and a solution of 17.7 g of polymer 1 (15% relative to dry dyestuff) in 100 ml of water at pH 7.5. The mixture obtained is bead-milled and spray-dried, both steps being carried out as described in Example 5.

Composition of the powder: 82.0% of dyestuff, 4.1% of dioctyl sulphosuccinate, 1.6% of dinaphthylmethanesulphonate and 12.3% of polymer 1.

Polyester fibres (not only in the form of wound packages but also as piece goods) are dried with the dyestuff formulation thus prepared a very level yellow with a high degree of fixation.

We claim:

1. A solid dyestuff formulation comprising a water-insoluble textile dyestuff, a disperstant and a polymeric protective colloid which is a copolymer of at least (a) an α,β-ethylenically unsaturated monocarboxylic acid, (b) a non-basic ester of an α,β-ethylenically unsaturated monocarboxylic acid, and (c) acrylonitrile, the weight ratio of the monomer components (a):(b):(c) being 10–50:89–10:1–40.

2. A solid dyestuff formulation according to claim 1, wherein (a) is (meth)acrylic acid and (b) a (meth)acrylate.

3. A solid dyestuff formulation according to claim 1, wherein the copolymer has a molecular weight of 1,000–500,000.

4. A solid dyestuff formulation according to claim 1, wherein the weight fraction of the dyestuff component is 30–98% and of the dispersant and of the protective colloid 1–35% each—without taking into account other auxiliaries which may be present.

5. A solid dyestuff formulation according to claim 2, wherein the dispersant is an anionic or non-ionic dispersant and the copolymer has a molecular weight of 1,500–150,000 and the weight ratio of the monomer components (a):(b):(c) is 20–50:70–10:10–40.

* * * * *